No. 765,869. PATENTED JULY 26, 1904.
R. N. WYNNE.
TRAP.
APPLICATION FILED APR. 4, 1904.
NO MODEL.

Witnesses
E. F. Stewart
C. H. Woodward

Robert N. Wynne, Inventor.
by C. A. Snow & Co.
Attorneys

No. 765,869. Patented July 26, 1904.

UNITED STATES PATENT OFFICE.

ROBERT NICHOLAS WYNNE, OF RALEIGH, NORTH CAROLINA.

TRAP.

SPECIFICATION forming part of Letters Patent No. 765,869, dated July 26, 1904.

Application filed April 4, 1904. Serial No. 201,547. (No model.)

*To all whom it may concern:*

Be it known that I, ROBERT NICHOLAS WYNNE, a citizen of the United States, residing at Raleigh, in the county of Wake and State of North Carolina, have invented a new and useful Trap, of which the following is a specification.

This invention relates to animal-traps, and has for its object to simplify and improve the construction and produce a device of this character adapted for trapping all sizes and kinds of animals which it is desired to destroy or imprison.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
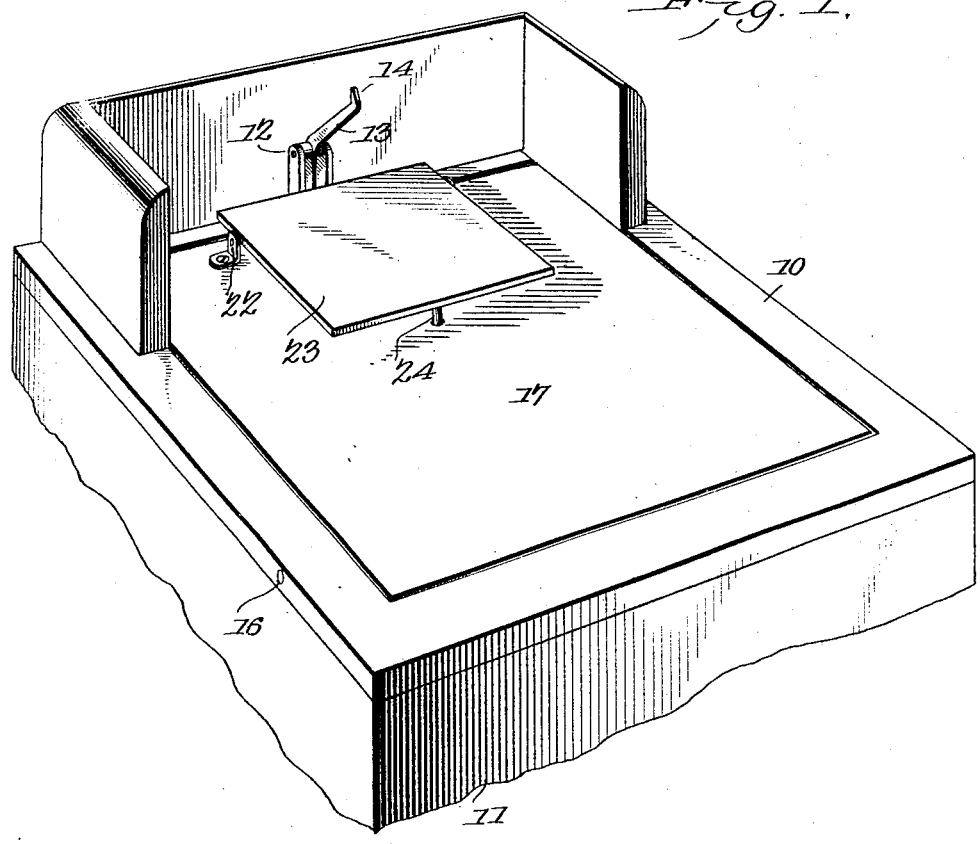
Figure 2:
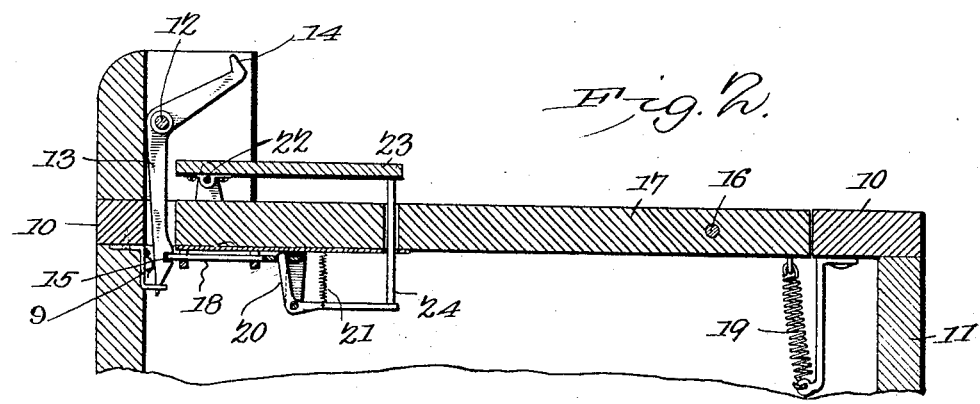

In the drawings thus employed, Figure 1 is a perspective view, and Fig. 2 is a sectional side elevation, of the improved trap.

The improved trap comprises an open frame 10 for disposal over a receptacle 11 of any approved form and which may be a tank containing water or other destructive liquid or a cage or other inclosure to imprison the animals when such disposition of the same is desired.

Pivoted at 12 upon the frame 10 is a bar 13, having at one end a bait-supporting hook 14 and provided near the other end with a transverse recess 15, with the portion of the bar below the recess inclined, the bar being normally pressed to active position by means of a leaf-spring 9, appropriately secured to the frame 10 in rear of the bar.

Pivoted at 16 in the frame 10 is a platform 17, forming a tilting closure to the frame and with a spring-controlled bolt 18 for engagement with the recess 15 to maintain the platform in its closed position, a spring 19 being attached to the platform to yieldably maintain it normally in closed position. The inner end of the bolt 18 is connected to a bell-crank 20, having a spring 21, operating to maintain the bolt 18 yieldably in engagement with the recess 15 in the bar.

Pivoted at 22 upon the platform 17, which for the purpose of this description will be referred to as the "primary" platform, is a smaller platform 23, which for the purpose of this description will be referred to as the "secondary" platform, and between the free edge of the secondary platform and the crank-lever 20 is a rod 24.

By this arrangement it will be obvious that a very slight weight applied to the free edge of the smaller platform 23 will depress the crank-arm and withdraw the bolt 18 from the recess 15 and release the larger platform together with the smaller platform, the weight of the animal on the platform serving to overcome the power of the spring 19 and causing the platforms to fall, thus precipitating the animal into the receptacle. After this operation the spring 19 immediately returns the platforms to their former positions, and the spring-controlled bolt 18 automatically engaging the recess 15 by the action of the inclined portion of the bar 13, as will be obvious, it being understood, of course, that the spring 9 is of sufficient strength to maintain the bar in proper position for engagement of the bolt 18 therewith. The trap is thus reset automatically after each action.

The smaller platform 23 being pivoted at one edge and having the tripping-rod 24 disposed at the free edge exerts a strong leverage force upon the bell-crank lever 20, so that a very slight pressure upon the smaller platform will be sufficient to release the bolt 18 and spring the trap, whereby a comparatively small and light animal will spring the trap if it simply places its foot upon the smaller platform in its efforts to reach the bait on the hook 14.

In the instance of larger animals or those capable of reaching the bait without mounting upon the smaller platform the action of pulling on the bait in an attempt to remove the same from the hook 14 will swing the lower end of the bar 13 inward against the influence of the spring 9, thereby releasing the platforms and permitting the latter to precipitate the animal, as heretofore explained, it being obvious that after the platform has been thus released the spring 9 will again return the bar to normal active position, as heretofore explained. Thus the same trap is equally efficacious for all sizes and weights of animals and without change of structure.

The smaller platform and the bars, levers, and bolts, together with the holding and operating-springs may be so delicately poised that even the larger sizes of insects—such as roaches, water-hogs, or beetles—may be trapped thereby, while at the same time the device can be readily adapted for the largest animals which it is desired to destroy or imprison.

The device is very simple in construction, certain in its action, and may be manufactured at small expense and employed in dwellings, warehouses, or other structures or employed in the woods for trapping wild animals with equal facility.

Having thus described the invention, what is claimed is—

1. In an animal-trap, a primary tilting platform for disposal over a receptacle and forming a movable closure to the same, a supporting member, a bolt movably connected to said primary platform for detachable engagement with the supporting member, a secondary platform movably connected to said primary platform, and releasing means between said bolt and secondary platform.

2. In an animal-trap, a primary tilting platform for disposal over a receptacle and forming a movable closure to the same, a supporting member, a bolt movably connected to said primary platform for detachable engagement with the supporting member, a secondary platform movably connected to said primary platform, a crank-lever connected to said bolt, and a rod between said secondary platform and said crank-arm, whereby the depression of said secondary platform will withdraw said bolt and release said platforms.

3. In an animal-trap, an inclosing framework for disposal over a receptacle, a platform mounted to swing within said frame and forming a movable closure to said receptacle, a bolt movably connected with said platform and operable for locking the latter in closed position, a secondary platform movable upon said primary platform, and releasing means between said bolt and secondary platform.

4. In an animal-trap, an inclosing frame for disposal over a receptacle, a primary platform engaging said frame and forming a closure to the same and intermediately pivoted therein, a spring operating to maintain said primary platform normally closed, a bolt connected with said primary platform and operable for locking the latter in closed position, a secondary platform movably disposed upon said primary platform, and releasing means between said bolt and secondary platform.

5. In an animal-trap, an inclosing frame for disposal over a receptacle, a bar supported and movably connected to said frame and having at one end a bait-supporting hook and at the other end a laterally-extending lug with an inclined face, a primary platform movably mounted in said frame and forming a closure to the same, a bolt movably connected to said primary platform for detachable engagement with the inclined lug on said bar, a secondary platform movably disposed upon said primary platform, and releasing means between said bolt and secondary platform.

In testimony that I claim the foregoing as my own I have hereto affixed my signature in the presence of two witnesses.

ROBERT NICHOLAS WYNNE.

Witnesses:
   HENRY J. YOUNG,
   WM. H. WILLSON.